United States Patent [19]

Oshita

[11] Patent Number: 4,737,047

[45] Date of Patent: Apr. 12, 1988

[54] PIPE JOINING STRUCTURE

[75] Inventor: Koji Oshita, Osaka, Japan

[73] Assignee: H. Tano & Co., Ltd., Kobe, Japan

[21] Appl. No.: 8,258

[22] Filed: Jan. 29, 1987

[51] Int. Cl.[4] .............................................. F16B 7/08
[52] U.S. Cl. .................................... 403/191; 403/205;
403/260
[58] Field of Search ................ 403/260, 205, 191, 237

[56] References Cited

U.S. PATENT DOCUMENTS

| | | | |
|---|---|---|---|
| 1,552,569 | 9/1925 | Schurman | 403/205 X |
| 1,974,080 | 9/1934 | Marker et al. | 403/191 X |
| 4,386,870 | 6/1983 | Baroody | 403/260 X |

*Primary Examiner*—Andrew V. Kundrat
*Attorney, Agent, or Firm*—Marshall, O'Toole, Gerstein, Murray, & Bicknell

[57] ABSTRACT

This disclosure relates to a joining structure for use in connecting pipes or tubes such as those which form a bicycle frame. The structure comprises a joining cylinder and a cylindrical part secured to the joining cylinder, the joining cylinder having an opening therein adapted to receive a pipe. A wall having a through hole is formed inside the opening of the joining cylinder, and an internal thread is formed in the internal periphery of the pipe. A core having on its external periphery an external thread which corresponds to the thread of the pipe is threaded into the pipe. The core has a threaded hole aligned with the through hole, and a bolt is provided for joining the wall and the core in such a manner that said bolt engages the wall and the core for joining the cylinder with the pipe.

12 Claims, 2 Drawing Sheets

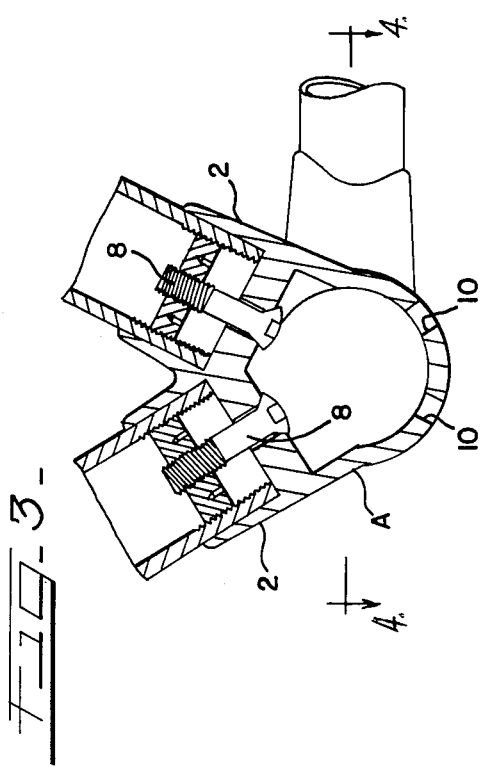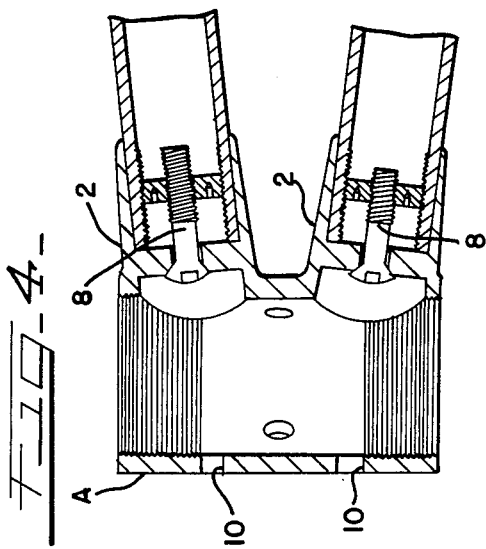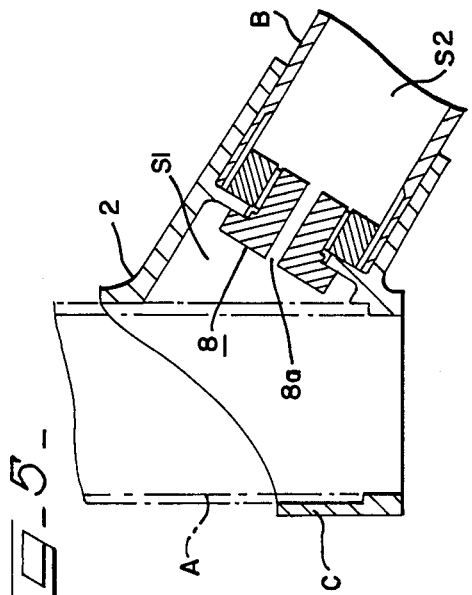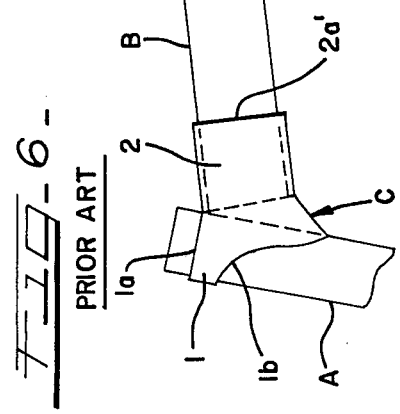

PIPE JOINING STRUCTURE

FIELD AND BACKGROUND OF THE INVENTION

This invention relates to a pipe joining structure wherein multiple pipes or tubes are joined by means of a joining cylinder formed either directly on one of the pipes or on a separate lug.

In the past, when it has been necessary to join a number of tubes or pipes at locations where great strength is required, gas or electric welding has been commonly used to form the joining structure. For example, on a bicycle frame or other similar structure, when an end of one pipe was to be joined at a specified angle to either the center or the end of a second pipe, as shown in FIG. 6, the second pipe B was joined to the first pipe A by first mounting a lug C onto the first pipe A, and then welding this lug C and the pipe A at both edges 1a and 1b of the mounting pipe part 1 of the lug. The second pipe B was then inserted into the joining cylinder 2 formed in the lug C, and the lug C and the second pipe B were welded at the edge 2a' of the pipe insertion end of the joining cylinder 2 formed in the lug C.

In recent years, there have been developed both new materials and composite structures in which these new materials are combined with each other or with conventional materials in order to utilize the characteristics of each of the materials. Because these new materials and the composite structures are both lightweight and strong, demand for them has grown rapidly in fields where lighter weight is needed, and they have come to be widely used as materials for pipes.

However, because these composite structures have composite properties, the joining methods which can be used to connect them are limited. For example, when using a composite structure such as carbon fiber reinforced plastic laminated to the external periphery of aluminum pipe, for the pipes of a bicycle frame, because one of the materials (in this case the carbon fiber reinforced plastic used in the external layer) is easily affected by high temperatures, the conventional method of gas welding cannot be used to form the joints.

It is a general object of this invention to provide a pipe joining structure which enables a strong joint to be formed regardless of the materials used.

SUMMARY OF THE INVENTION

This invention relates to a pipe joining structure for connection with a pipe, comprising a joining cylinder, said joining cylinder having an opening therein adapted to receive said pipe, a wall having a through hole formed inside said opening of said joining cylinder, an internal thread formed in the internal periphery of the pipe, a core having on its external periphery an external thread which corresponds to the thread of the pipe, the core being adapted to be threaded into the pipe, said core having a threaded hole aligned with said through hole, and a bolt for joining said wall and said core in such a manner that said bolt engages said wall and screws into said core for joining said cylinder with the pipe.

BRIEF DESCRIPTION OF THE DRAWINGS

The invention will be better understood from the following detailed description taken in conjunction with the accompanying figures of the drawings, wherein:

FIG. 3 is a side view partially in cross section showing a different embodiment of the invention;

FIG. 4 is a cross-sectional view taken on the line 4—4 of FIG. 3;

FIG. 5 is a side cross-sectional view showing still another embodiment of the invention; and FIG. 6 is a side view showing a prior art joining structure.

DETAILED DESCRIPTION OF THE DRAWINGS

Preferred embodiments of pipe joining structures in accordance with this invention are described in conjunction with a bicycle frame, but are also useful on other structures.

Figure 1:
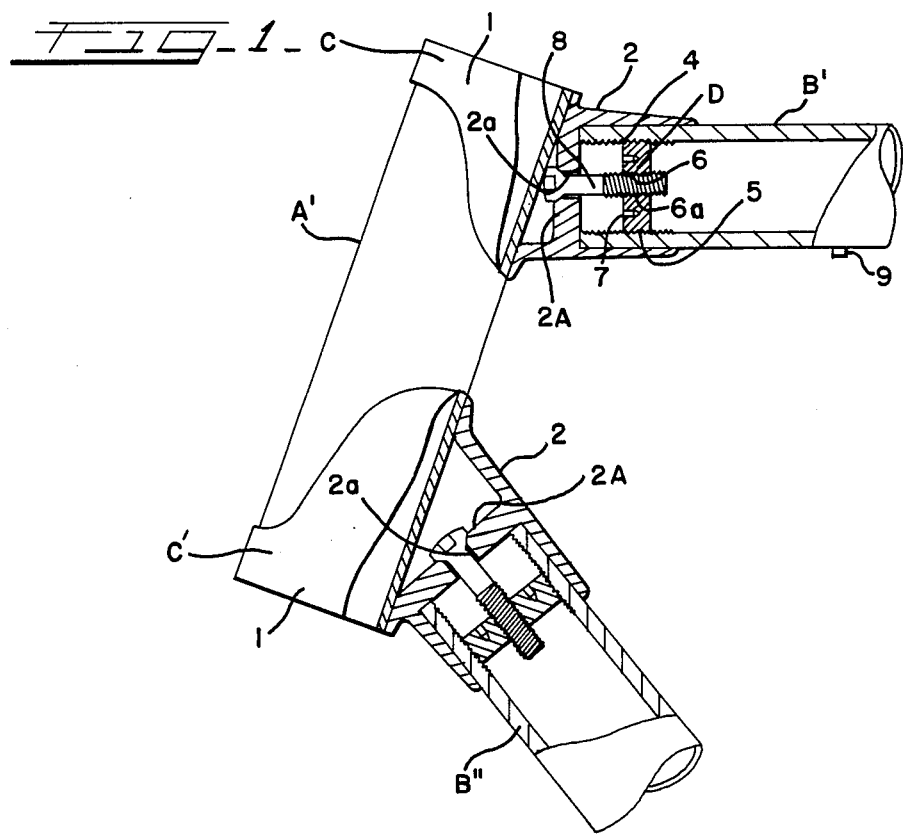
FIG. 1 is a side view partially in cross section showing the joining structures, in accordance with this invention, in the area around the head tube of a bicycle.

In FIG. 1, the letter A' indicates the head tube of a bicycle (which is the first pipe), the letters B' and B" indicate the top tube and the down tube, respectively (which are second pipes), and the letters C and C' indicate lugs. In the embodiments shown in FIGS. 1 and 2, a lug is provided to secure an end portion of a first tube to a side of a second tube. The first tube may form a right angle or an acute angle with respect to the second tube.

The lug C consists of a mounting pipe part 1 which is mounted on the head tube A', and a joining cylinder 2 into which the top tube B' is inserted. The parts 1 and 2 have cylindrical openings which receive the tubes. A wall 2A having a through hole 2a is formed inside the joining cylinder 2 adjacent the mounting pipe part 1.

In addition, an internal thread 4 is formed on the internal periphery of the top tube B' at the end of the tube, and a nut or core D having an external thread 5 corresponding to the thread 4 is screwed into the top tube B'. Also, an internally threaded through hole 6 is formed at approximately the axial center of the core D. Furthermore, engagement holes 7 are formed on the outer side of this core D for engagement by the engagement prongs of an insertion tool such as a spanner wrench (not shown in the drawings) for screwing the core D into the top tube B'.

Thus, to join the head tube A' with the top tube B', first an adhesive is applied to the threads 4 on the internal periphery of the top tube B' and to the external threads of the core D, and the core D is screwed into the top tube B'. An adhesive is then applied to the internal periphery of the joining cylinder 2 of the lug C and to the end portion of the top tube B' to be inserted into the lug.

Next, either the top tube B' is inserted into the joining cylinder 2 of the lug C (or aligned with the front or open end of the cylinder 2), a bolt 8 having a head is inserted into the through-hole 2a formed in the wall 2A from the back of the wall, and, while the head of this bolt 8 engages the wall 2A, the threaded end of the bolt 8 is screwed into the through hole 6 in the core D which is inside the top tube B'. In this state, by turning the bolt 8 so that it screws further into the core D, the wedging action of the threads pulls the top tube B' toward the wall 2A of the lug C. Then, when the end of the top tube B' comes in contact with the wall 2A, the joining of the lug C and the top tube B' is complete.

When joining the lug C and the top tube B' as described above, the angular location of the top tube B' with respect to the lug C may be adjusted so that any mounting fixtures 9 for the brake wires (not shown in the drawings), etc., on the top tube B' are in the prescribed positions.

When screwing the bolt 8 into the core D (assuming that the adhesive has not set as yet), any tendency of the core to turn with the screw will result in the core threading farther into the top tube. This action would help rather than hinder the joining of the parts. Once the adhesive has set, the top tube B', the lug C and the core D are rigidly secured together. The wall 2A also serves to strengthen the lug C, with the result that a very strong connection is formed.

When the joining of the lug C and the top tube B' is completed, the mounting pipe part 1 of the lug C is mounted onto the head tube A', thus joining the head tube A' and the top tube B'. This mounting of the lug C on the head tube A' may be accomplished by an adhesive or by various mechanical means such as rivets, or by a combination of the two.

Figure 2:
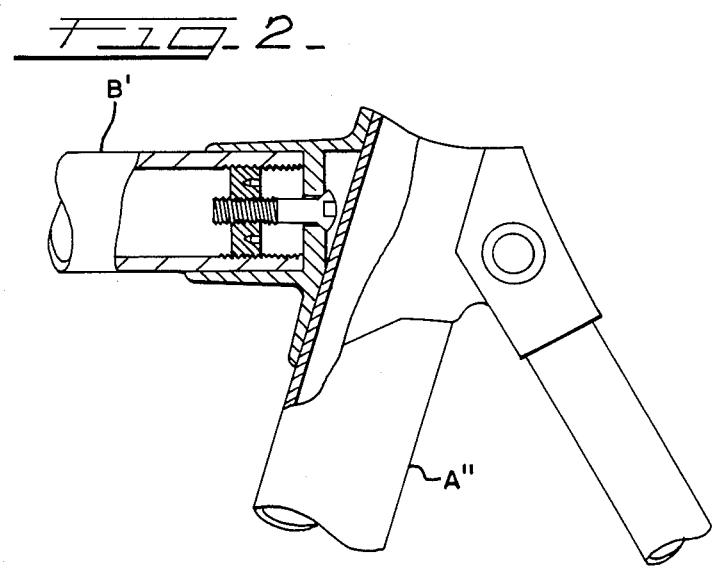
FIG. 2 is a side view partially in cross section showing the joining structure of the seat tube and the top tube.

This joining structure can also be used for the joining structure of the head tube A' and the down tube B'', and also for the joining structure of the top tube B' and the seat tube A'' shown in FIG. 2. Since these structures and the method of assembly are essentially the same as those described above, they are not repeated herein.

The embodiments described above are for the joining of multiple tubes via a lug. However, as shown in FIGS. 3 and 4, the joining structure can also join the end portions of a plurality of tubes in the same way, when first pipe A and the joining cylinders 2 are formed in one piece. In this embodiment, it is necessary to provide a through hole 10 aligned with each bolt 8, for the mounting of the bolts 8 onto the first pipe A and for the use of the tool (for example, a screwdriver, not shown) used to turn the bolts 8.

In addition, as shown in FIG. 5, it is also possible to provide a through hole 8a in the axial center of a large diameter bolt 8, thus connecting the space S1 which is formed between the joining cylinder 2 of the lug C, which is to be mounted onto the pipe A, and the pipe A with the space S2 inside the pipe B, which is joined to the joining cylinder 2. With this design, when the lug C, which is joined to pipe B, is secured to pipe A using an adhesive, the interior air inside the space S1, which expands as a result of the heat, will be allowed to escape into space S2. For example, an adhesive may be used which sets or hardens by the influence of heat, and the heated air is vented by the hole 8a.

When using a joining structure according to this invention, even if the pipes of a bicycle frame are made of a composite material (such as carbon fiber reinforced plastic laminated to the external periphery of aluminum pipes) which cannot be welded, or even if the pipes to be joined are made of different materials (such as a carbon fiber reinforced plastic pipe and a light-metal pipe), the joining can be accomplished easily.

Moreover, because the only stress acting upon the bolt and the core, which are the parts directly joining the two pipes, is in the axial direction, and because the bending moment acting upon the joint is absorbed by the engaging portions of the joining cylinder and the pipe which is inserted into it, it is possible to obtain an exceptionally strong joint. Thus, it is possible to obtain a joint which is much stronger than one using only an adhesive, and, furthermore, the reliability of the joint when used under vibration is greatly improved.

In addition, because the second pipe is pulled toward the wall of the other pipe via the core due to the turning of a bolt (wedging action), there is no unnecessary gap between the second pipe and the wall, and it is possible to obtain a joint in which the positional relationships in both the axial direction (the longitudinal direction) and the angular direction are always correct, thus making it easy to ensure the precision manufacture of the bicycle frame.

Although the embodiments described above only refer to the use of the joining structure of this invention as a joining structure for bicycle frames, of course it is also possible to use this joining structure for joining conventional pipes as well.

In summary, this invention makes it possible to join multiple members regardless of the materials, whereby the invention can have an extremely far-reaching affect on expanding the range of application of new materials (including composite materials). Moreover, not only is there absolutely no loss of strength in comparison to a welded joining structure, but because it is a mechanical joining structure, this invention greatly improves the reliability and eliminates the fear of joint failure. In addition, in comparison to welding, because the only work required for this joining structure is mechanical work and assembly work, the work can easily be done with accuracy and strength even by less-skilled workers, because no welding is necessary.

Furthermore, as described in the embodiments herein, when this joining structure is used for bicycles, because the frame, which previously had to be shipped from the factory in a single assembled piece, is an assembly of smaller parts, the parts may be shipped and stored in unassembled form. Thus, less space is required for storage and shipment to the dealers who perform the final assembly, thus reducing costs.

What is claimed is:

1. A pipe joining structure for securing first and second pipes together, the pipes extending at angles to each other and the first pipe having an internal thread in the internal periphery thereof, comprising a joining cylinder, said joining cylinder having an opening therein adapted to receive said first pipe, a wall having a through hole formed inside said opening of said joining cylinder, a core having on its external periphery an external thread which corresponds to the thread of the first pipe and said core being adapted to be threaded into said first pipe, said core having a threaded hole aligned with said through hole, a bolt for joining said wall and said core in such a manner that said bolt engages said wall and said core for joining said cylinder with the first pipe, and mounting means separate from said bolt on said joining cylinder and adapted to be secured to a side of said second pipe.

2. A pipe joining structure as described in claim 1, in which the internal periphery of said joining cylinder and the external periphery of the first pipe which is inserted into said joining cylinder are further joined by adhesive.

3. Pipe joining structure for use with a first pipe and a second pipe, said first pipe having an end portion and threads formed internally of said portion, comprising a joining cylinder having an opening adapted to receive said end portion, an interior wall formed on said joining cylinder and extending across said opening, said wall having a through hole formed through it, a core having an external thread and adapted to be threaded into said thread of said end portion of said first pipe, said core having a threaded hole formed therein, screw fastener means threaded into said hole of said core and extending through said through hole and engaging said wall, said screw fastener holding said core and said end portion in said opening of said cylinder, and mounting means on said joining cylinder and adapted to be secured to a side of the second pipe, said mounting means being separate from said screw fastener means.

4. Structure according to claim 3, and further comprising an adhesive between said joining cylinder, said core and said end portion of said first pipe.

5. Structure according to claim 3, wherein said wall engages the end portion of said first pipe.

6. Structure according to claim 3, wherein said mounting means comprises a cylindrical portion secured to said joining cylinder, said joining cylinder extending at an angle to said cylindrical portion.

7. Structure according to claim 6, wherein said cylindrical portion is adapted to extend around the second pipe.

8. A pipe assembly comprising a first pipe and a second pipe, said first pipe having an end portion and threads formed internally of said portion, a joining cylinder having an opening receiving said end portion, an interior wall formed on said joining cylinder and extending across said opening, said wall having a through hole formed through it, a core having an external thread threaded into said thread of said end portion of said first pipe, said core having a threaded hole formed therein, screw fastener means threaded into said hole of said core and extending through said through hole and engaging said wall, said screw fastener holding said core and said end portion in said opening of said cylinder, and mounting means on said joining cylinder and secured to a side of said second pipe, said mounting means being separate from said screw fastener means.

9. Structure according to claim 8, and further comprising an adhesive between said joining cylinder, said core and said end portion of said first pipe.

10. Structure according to claim 8, wherein said wall engages the end portion of said first pipe.

11. Structure according to claim 8, and further including a cylindrical portion secured to said joining cylinder, said joining cylinder extending at an angle to said cylindrical portion.

12. Structure according to claim 11, wherein said cylindrical portion is adapted to be secured to a second pipe.

* * * * *